United States Patent [19]

Rasmussen

[11] Patent Number: 4,690,310
[45] Date of Patent: Sep. 1, 1987

[54] SLEEVE PUMP

[75] Inventor: Robert Rasmussen, Minneapolis, Minn.

[73] Assignee: Progressive Assembly Machine Co., Inc., Plymouth, Minn.

[21] Appl. No.: 807,502

[22] Filed: Dec. 11, 1985

[51] Int. Cl.⁴ .............................................. B65B 3/30
[52] U.S. Cl. ................................. 222/309; 222/334; 222/388; 222/409; 417/510
[58] Field of Search ............... 222/251, 255, 282, 309, 222/334, 372, 386, 387, 388, 389, 409, 559, 43, 217, 249; 417/510

[56] References Cited

U.S. PATENT DOCUMENTS

| | | | |
|---|---|---|---|
| 2,121,070 | 6/1938 | Crandall | 222/255 |
| 3,118,390 | 1/1964 | Kinsley | 417/510 X |
| 3,149,756 | 9/1964 | Carpigiani | 222/409 X |
| 3,160,331 | 12/1964 | Trumbull et al. | 222/409 X |
| 3,227,325 | 1/1966 | Bates | 222/334 X |
| 4,293,010 | 10/1981 | Winiasz | 222/309 X |
| 4,545,507 | 10/1985 | Barall | 222/334 X |

Primary Examiner—Joseph J. Rolla
Assistant Examiner—Kevin P. Shaver
Attorney, Agent, or Firm—Dorsey & Whitney

[57] ABSTRACT

A fluid dispensing apparatus is provided especially designed to minimize the amount of fluid retained in the apparatus during a pumping cycle. The apparatus includes a pair of concentrically aligned inner and outer tubular sleeves shiftable relative to each other for alignment of their respective inlet ports. A piston is received within the inner sleeve, and a nozzle member is axially aligned with and receivable in the inner sleeve.

12 Claims, 5 Drawing Figures

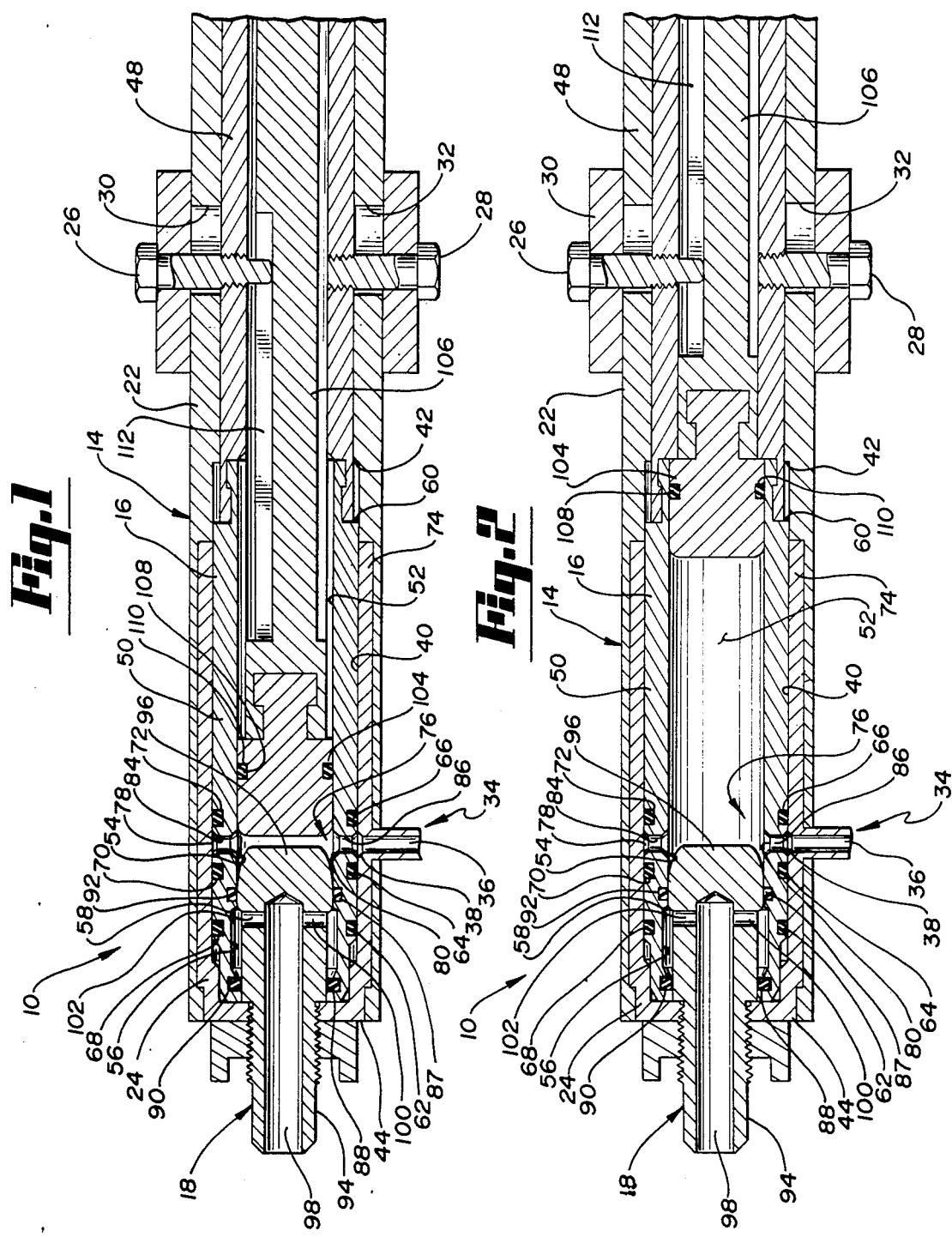

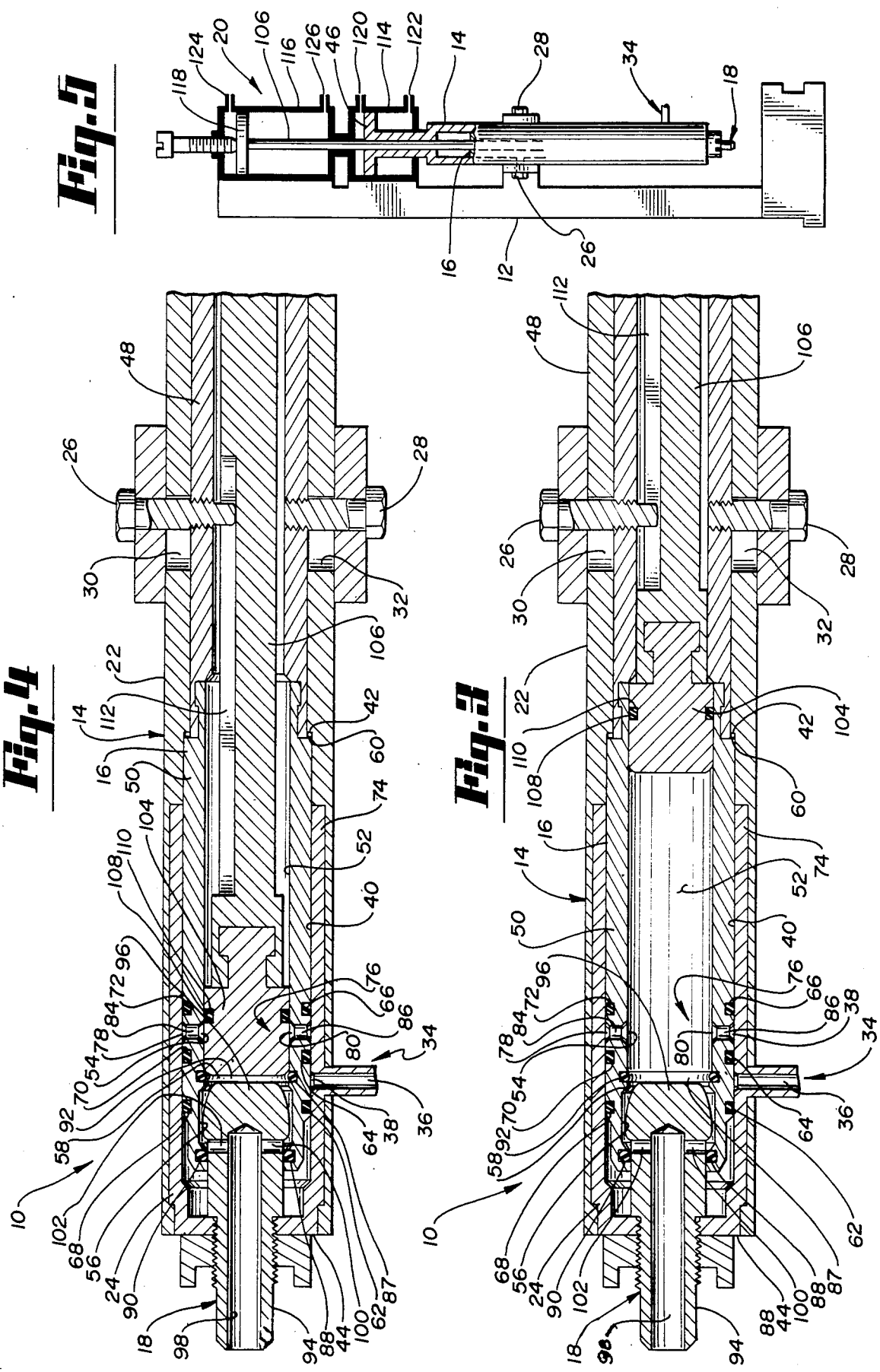

4,690,310

SLEEVE PUMP

TECHNICAL FIELD

This invention pertains to fluid dispensing apparatus. In particular it pertains to a pump specially designed for the accurate dispensation of small quantities of fluid.

BACKGROUND ART

Numerous industries require the repetitive, precision dispensing of liquid in carefully metered volumes. Certain applications can require accurate dispensation (±1% accuracy) of fluids in volumes as small as 1/20th of a drop, or 0.002 cc. A fluid dispensing system which minimized the amount of fluid retained within the system during each dispensing cycle would greatly assist in the attainment of accurate dispensation of fluids in small, metered amounts.

SUMMARY OF THE INVENTION

The fluid dispensing apparatus disclosed herein is specially designed to dispense fluids to within ±1% accuracy in metered amounts as small as 0.005 cc. The fluid dispensing apparatus hereof includes an outer tubular sleeve, an inner tubular sleeve shiftably carried within the outer sleeve, a pumping piston carried within a fluid chamber defined by the inner sleeve, and a nozzle member. The inner and outer sleeves are concentrically oriented about the nozzle member and the pumping piston, thereby minimizing the internal fluid carrying cavities within the apparatus so as to minimize the amount of fluid retained within the pump during each pumping cycle.

BRIEF DESCRIPTION OF THE DRAWINGS

FIG. 1 is a fragmentary, sectional drawing of a fluid dispensing apparatus in accordance with the present invention at the beginning of a pumping cycle.

FIG. 2 is similar to FIG. 1 with the apparatus configured as it would be at the end the intake portion of a pumping cycle;

FIG. 3 is similar to FIG. 2, but with the apparatus configured as it would be at the beginning of the discharge portion of a pumping cycle;

FIG. 4 is similar to FIG. 3 but with the apparatus configured as it would be at the end of a discharge cycle; and FIG. 5 is a sectional, fragmentary, generally schematic depiction of a dispensing apparatus in accordance with the present invention.

DETAILED DESCRIPTION OF THE DRAWINGS

Referring to the drawings, a fluid dispensing apparatus 10 in accordance with the present invention broadly includes support frame 12, outer tubular sleeve 14, inner tubular sleeve 16, nozzle member 18 and actuating mechanism 20.

Outer tubular sleeve 14 comprises a casing including main sleeve portion 22, and insert portion 24. The main body portion 22 and insert portion 24 are molded from a material that is compatible with the material being pumped. Suspension screws 26, 28 are received through slots 30, 32 in the outer tubular sleeve 14. Outer sleeve inlet port 34 extends through the outer tubular sleeve 14. The inlet port 34 includes radially extending channel 36 and a circumferential groove 38 in the inner surface 40 of the outer tubular sleeve. The outer sleeve inner surface includes an annular shoulder 42. The outer tubular sleeve 14 terminates at its dispensing end at nozzle member receiving front wall 44. The opposed end of sleeve 14 terminates at outer tubular sleeve actuating piston 46 of actuating mechanism 20.

The inner tubular sleeve 16 includes rearward portion 48 and dispensing end portion 50. The rearward portion 48 and dispensing end portion 50 are connected together by a bayonet type latch. The internal surface 52 of the inner tubular sleeve defines a fluid chamber 54 having opposed, circular in cross section ends, and further defines a second circular in cross section cavity 56. The second cavity 56 is contiguous with the fluid chamber 54.

The intersection between the second cavity 56 and the fluid chamber 54 defines the outlet port 58 of the fluid chamber 54. As can be seen from the drawings, the diameter of the second cavity 56 is slightly greater than the diameter of fluid chamber 58. The external diameter of the dispensing end portion 50 of the inner sleeve is slightly greater than the external diameter of the rearward portion 48 of the inner tubular sleeve, thereby presenting an annular abutment surface 60.

First, second and third sealing O-rings 62, 64, 66 are retained within annular grooves 68, 70, 72, respectively, in the outer surface 74 of the inner sleeve 16.

Inner sleeve inlet port 76 includes circumferential groove 78, in the outer surface 74 of the inner tubular sleeve 16, and circumferential groove 80 in the inner surface 52 of the inner tubular sleeve 16, and radially extending channels 84, 86. Nozzle receiving and sealing O-rings 87, 88 are received within annular retaining grooves 90, 92 in the internal surface 52 of the inner tubular sleeve.

Screws 26, 28 are threadably received within the internal tubular sleeve 16 for fixedly positioning the inner tubular sleeve 16 relative to the support frame 12.

Nozzle member 18 is threadably received through outer tubular sleeve front wall 44. Nozzle member 18 includes dispensing channel defining element 94 and seal member 96. Dispensing channel 98 is oriented along the center axis defined by the concentrically aligned outer tubular sleeve 14 and inner tubular sleeve 16, and is connnected to second cavity 56 in fluid communicating relationship via radially extending channels 100, 102. Seal element 96 has a diameter just smaller than the diameter of fluid chamber 54 such that it can be received within the fluid chamber 54 in fluid tight relationship.

Fluid actuating mechanism 20 includes piston 104 connected by a bayonet type latching mechanism to piston rod 106. The piston 104 is of a diameter just smaller than the fluid chamber 54 such the piston may be shifted along the fluid chamber 54 while maintaining fluid tight relationship. A sealing O-ring 108 is carried in annular groove 110 to effect a fluid tight seal between the piston 104 and the internal surface 52 of the inner tubular sleeve 16 that defines the fluid chamber 54. Piston rod 106 includes stroke limiting, axially aligned groove 112 which receives the tip of screw 26 therein. The piston rod 106 is received within, and is coaxially aligned with, the inner tubular sleeve 16.

Fluid actuating mechanism 20 also includes pressure chambers 114 and 116. The outer tubular sleeve actuating piston 46 is received within pressure chamber 114. The piston rod 106 terminates in a piston 118 that is received in chamber 116. Chamber 114 includes ports 120, 122 that are adapted for coupling to a source of pressurized fluid for effecting the controlled movement of outer tubular sleeve actuating piston 46 within pressure chamber 114. Chamber 116 is similarly fitted with ports 124, 126.

Operation of the fluid dispensing apparatus in accordance with the present invention will be described with reference to the sequential configuration of the apparatus 10 as depicted in FIGS. 1-4. It is to be understood that shifting of piston 104 within fluid chamber 54 is accomplished by application of pressurized fluid to pressure chamber 116 of actuating mechanism 20. Shifting of the inner sleeve 16 relative to the outer sleeve 14 is accomplished by maintaining the inner sleeve 16 fixed in position relative to the support frame 12, and applying pressurized fluid to pressure chamber 114 of actuating mechanism 20 to effect movement of the outer sleeve 14.

FIG. 1 depicts the outer sleeve 14 and inner sleeve 16 shifted to a first position relative to each other wherein the outer sleeve inlet port 34 and inner sleeve inlet port 76 are in alignment. With the sleeves 14, 16 in the described first position, the seal element 96 of nozzle member 18 is received within the fluid chamber 54 of inner tubular sleeve 16 such that outlet port 58 of the fluid chamber is blocked by the seal element 96. The piston 104 of fluid actuating mechanism 20 is shifted leftwardly, from the perspective of FIGS. 1-4. It will be understood that the outer sleeve inlet port 34 is adapted for connection to a source of fluid to be dispensed. The apparatus 10, as depicted in FIG. 1, is in a configuration to begin drawing fluid from the source of fluid into the internal fluid chamber 54.

Referring now to FIG. 2, the piston 104 is shown shifted rightwardly along the length of the fluid chamber 54, while all other members of the dispensing apparatus 10 are maintained in the configuration of FIG. 1. A negative pressure is created in the fluid chamber 54 as the piston 104 is shifted rightwardly, thereby drawing fluid through the outer tubular sleeve inlet port 34 and inner sleeve inlet port 76.

Referring to FIG. 3, the fluid received within fluid chamber 54 is expelled through the nozzle member 18 by first shifting the outer tubular sleeve 14 relative to the inner tubular sleeve 16 to a second position, as depicted in FIG. 3, such that the outer sleeve inlet port 34 and inner sleeve inlet port 76 are misaligned, thereby preventing flow of fluid through the inlet ports 34, 76. Note that, because the nozzle member 18 is fixedly, threadably received within the front wall 44 of outer tubular sleeve 14, the shifting of the outer tubular sleeve 14 relative to inner tubular sleeve, as depicted in FIG. 3, withdraws seal element 96 from the outlet port 58 of fluid chamber 54. The fluid chamber 54 is thereby placed in fluid communication with dispensing channel 98 via the second cavity 56 of inner tubular sleeve 16, and the nozzle radial channels 100, 102.

Referring to FIG. 4, fluid is expelled from the fluid chamber 54 through the dispensing channel 98 by shifting the piston 104 leftwardly along the length of fluid chamber 54.

Once the piston has traveled the length of the fluid chamber 54, expelling all the fluid through the dispensing channel 98, the outer tubular sleeve is shifted rightwardly relative to the inner tubular sleeve to the first position described above and depicted in FIG. 1, thereby reseating the seal element 96 of the nozzle member 18 in the outlet port of fluid chamber 58. The fluid dispensing apparatus 10 is now reconfigured to again begin the dispensing cycle.

The seal element 96 has a larger diameter than the dispensing channel defining element 94 of nozzle member 18. Referring to FIG. 4, note that the seal element 96 is essentially completely received within the second cavity when the fluid element 96 is unseated from the fluid chamber outlet port 58. Note also, referring to FIG. 1, that the seal element 96 is essentially completely received within fluid chamber 54 when in its fully seated position. Shifting of the seal element 96 out of the second cavity 56 into the fluid chamber 54 effectively increases the volume of cavity 56, creating a negative pressure in the second cavity 56. Fluid is thereby drawn into the second cavity 56 from the nozzle dispensing channel 98 via the nozzle radial channels 100, 102, inhibiting dripping of fluid from the nozzle dispensing channel 98.

The unique concentric alignment of the outer tubular sleeve 14, inner tubular sleeve 16, and piston 106, together with the unique seating arrangement of nozzle member 18 within the fluid chamber 54, minimizes the amount of fluid retained within the fluid dispensing apparatus 10 during a dispensing cycle. The described design of the dispensing apparatus 10 ensures that essentially all fluid drawn into the fluid chamber 54 is expelled from the fluid dispensing apparatus 10 each cycle, thereby promoting consistent, accurate dispensation of metered amounts of fluid.

I claim:

1. An apparatus for dispensing fluid, comprising:

an outer sleeve presenting an outer sleeve casing and having structure defining an outer sleeve inlet port through said outer sleeve adapted for coupling to a source of said fluid;

an inner sleeve, presenting an inner sleeve casing, shiftably carried within said outer sleeve casing and including structure defining an internal fluid chamber, an inner sleeve inlet port through said inner sleeve in fluid communicating orientation with said fluid chamber, and a fluid chamber outlet port, said inner sleeve and said outer sleeve shiftable relative to each other between a first position wherein said outer sleeve inlet port and said inner sleeve inlet port are aligned for fluid communication through said outer sleeve and said inner sleeve between said source of said fluid and said fluid chamber, and a second position wherein said outer sleeve inlet port and said inner sleeve inlet port are misaligned whereby fluid communication between said source of said fluid and said fluid chamber is blocked;

piston means received within said inner sleeve and shiftable along a first path of travel for drawing fluid into said fluid chamber through said inner sleeve inlet port and said outer sleeve inlet port when said inner sleeve and said outer sleeve are in said first position, and shiftable along an opposed path of travel for expelling said fluid from said chamber through said fluid chamber outlet port when said inner sleeve and said outer sleeve are in said second position;

first actuating means operably coupled to said inner sleeve and said outer sleeve for shifting said inner and outer sleeves between said first and second positions; and second actuating means operably coupled to said piston means for shifting said piston along said paths of travel independently of the position of said inner sleeve relative to said outer sleeve.

2. The apparatus as claimed in claim 1, said inner sleeve casing being tubular and having an external surface, said inner sleeve inlet port comprising structure defining a circumferential groove in said inner sleeve casing external surface and a radially extending passage through said inner sleeve casing.

3. The apparatus as claimed in claim 2, said outer sleeve casing being tubular and having an internal surface, said outer sleeve inlet port comprising structure defining a circumferential groove in said outer sleeve internal surface and a radially extending passage through said outer sleeve casing.

4. An apparatus as claimed in claim 1, including:
a nozzle member including structure defining a fluid dispensing channel and a seal member receivable within said fluid chamber outlet port whereby fluid communication between said fluid chamber and said dispensing channel is blocked by said seal member when said inner sleeve and said outer sleeve are in said first position; and
means operably connecting said fluid chamber and said dispensing channel in fluid communication therebetween when said inner sleeve and said outer sleeve are in said second position.

5. The apparatus as claimed in claim 4, said inner sleeve being tubular, said fluid chamber comprising a first, generally cylindrical cavity having a circular cross section and opposed ends, said fluid chamber outlet port comprising one of said cavity ends and having a first diameter, said seal member comprising an element having a circular cross section, said element having an element diameter just smaller than said first diameter whereby said element can be received through said one cavity end comprising said outlet port in fluid tight relationship therewith when said inner sleeve and said outer sleeve are in said first position.

6. The apparatus as claimed in claim 5, said means operably connecting said fluid chamber and said dispensing channel comprising a second cavity in said inner sleeve, said second cavity being contiguous with said fluid chamber outlet port and having a second cavity diameter larger than said first diameter, whereby said fluid may be channeled around said seal member when said inner sleeve and said outer sleeve are in said second position.

7. The apparatus as claimed in claim 6, said fluid chamber having a central axis, said fluid dispensing channel of said nozzle member comprising a first passage spaced apart from said second cavity and having a first axis generally parallel to said central axis, and a second passage contiguous with said second cavity and having a second axis transverse to said central axis.

8. The apparatus as claimed in claim 7, said seal member being received within said second cavity when said inner sleeve and said outer sleeve are in said second position, and said seal member at least partially clearing said second cavity when said inner sleeve and said outer sleeve are relatively shifted to said second position, whereby fluid is drawn from said dispensing channel into said second cavity as said inner sleeve and said outer sleeve are relatively shifted to said second position thereby inhibiting dripping of said fluid from said dispensing channel when said inner sleeve and said outer sleeve are in said second position.

9. An apparatus for dispensing fluid, comprising:
an outer sleeve presenting an outer sleeve casing and having structure defining an outer sleeve inlet port through said outer sleeve adapted for coupling to a source of said fluid;
an inner sleeve, presenting an inner sleeve casing, shiftably carried within said outer sleeve casing and including structure defining an internal fluid chamber, an inner sleeve inlet port through said inner sleeve in fluid communicating orientation with said fluid chamber, and a fluid chamber outlet port,
said inner sleeve and said outer sleeve shiftable relative to each other between a first position wherein said outer sleeve inlet port and said inner sleeve inlet port are aligned for fluid communication through said outer sleeve and said inner sleeve between said source of said fluid and said fluid chamber, and a second position wherein said outer sleeve inlet port and said inner sleeve inlet port are misaligned whereby fluid communication between said source of said fluid and said fluid chamber is blocked;
actuating means operably coupled to said fluid chamber and said inner sleeve and said outer sleeve for shifting said inner sleeve relative to said outer sleeve between said first and second positions, and for drawing fluid into said fluid chamber through said inner sleeve inlet port and said outer sleeve inlet port when said inner sleeve and said outer sleeve are in said first position, and for expelling said fluid from said chamber through said fluid chamber outlet port when said inner sleeve and said outer sleeve are in said second position;
a nozzle member including structure defining a fluid dispensing channel and a seal member receivable within said fluid chamber outlet port whereby fluid communication between said fluid chamber and said dispensing channel is blocked by said seal member when said inner sleeve and said outer sleeve are in said first position; and
means operably connecting said fluid chamber and said dispensing channel in fluid communication therebetween when said inner sleeve and said outer sleeve are in said second position,
said inner sleeve being tubular, said fluid chamber comprising a first, generally cylindrical cavity having a circular cross section and opposed ends, said fluid chamber outlet port comprising one of said cavity ends and having a first diameter, said seal member comprising an element having a circular cross section, said element having an element diameter just smaller than said first diameter whereby said element can be received through said one cavity end comprising said outlet port in fluid tight relationship therewith pg,20 when said inner sleeve and said outer sleeve are in said first position.

10. The apparatus as claimed in claim 9, said means operably connecting said fluid chamber and said dispensing channel comprising a second cavity in said inner sleeve, said second cavity being contiguous with said fluid chamber outlet port and having a second cavity diameter larger than said first diameter, whereby said fluid may be channeled around said seal member when said inner sleeve and said outer sleeve area in said second position.

11. The apparatus as claimed in claim 10, said fluid chamber having a central axis, said fluid dispensing channel of said nozzle member comprising a first passage spaced apart from said second cavity and having a first axis generally parallel to said central axis, and a second passage contiguous with said second cavity and having a second axis transverse to said central axis.

12. The apparatus as claimed in claim 11, said seal member being received within said second cavity when said inner sleeve and said outer sleeve are in said second position, and said seal member at least partially clearing said second cavity when said inner sleeve and said outer sleeve are relatively shifted to said second position, whereby fluid is drawn from said dispensing channel into said second cavity as said inner sleeve and said outer sleeve are relatively shifted to said second position thereby inhibiting dripping of said fluid from said dispensing channel when said inner sleeve and said outer sleeve are in said second position.

* * * * *